(12) United States Patent
Tang

(10) Patent No.: US 10,261,164 B2
(45) Date of Patent: Apr. 16, 2019

(54) ACTIVE PERSON POSITIONING DEVICE AND ACTIVITY DATA ACQUISITION DEVICE

(71) Applicant: BOE TECHNOLOGY GROUP CO., LTD., Beijing (CN)

(72) Inventor: Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/926,644

(22) Filed: Mar. 20, 2018

(65) Prior Publication Data
US 2019/0064311 A1   Feb. 28, 2019

(30) Foreign Application Priority Data

Aug. 22, 2017   (CN) .......................... 2017 1 0723516

(51) Int. Cl.
*G06T 7/73*   (2017.01)
*G01S 5/00*   (2006.01)
(Continued)

(52) U.S. Cl.
CPC ............ *G01S 5/0027* (2013.01); *A63B 67/00* (2013.01); *G06K 9/00362* (2013.01); *G06T 7/73* (2017.01);
(Continued)

(58) Field of Classification Search
CPC .. H04B 1/103; H04B 1/7097; H04B 1/71635; H04B 1/71637; H04B 1/719; A41D 1/002; A41D 1/005; A41D 1/04; A41D 2600/10; A42B 3/30; A63B 24/0021; A63B 24/0062; A63B 71/06; A63B 71/0619; A63B 71/0622; A63B 71/0686;
(Continued)

(56) References Cited

U.S. PATENT DOCUMENTS

| 9,602,152 B2 * | 3/2017 | Wohl | G06K 7/10227 |
| 2012/0188452 A1 * | 7/2012 | Keiser | G06T 13/00 348/559 |
| 2014/0361875 A1 * | 12/2014 | O'Hagan | G06K 7/10227 340/8.1 |

FOREIGN PATENT DOCUMENTS

| CN | 104645587 A | 5/2015 |
| CN | 105288984 A | 2/2016 |
| CN | 106528841 A | 3/2017 |

* cited by examiner

*Primary Examiner* — Hai Phan
*Assistant Examiner* — Anthony D Afrifa-Kyei
(74) *Attorney, Agent, or Firm* — Nath, Goldberg & Meyer; Joshua B. Goldberg; Stanley N. Protigal

(57) ABSTRACT

The present disclosure provides a positioning device and an activity data acquisition device. The positioning device includes: a receiving module configured to receive coarse-positioning location information of each determined person and actual location information of an unknown person to be identified on an activity field; a calculating module configured to calculate a first distance between a position indicated by the actual location information of the person to be identified and a position indicated by the coarse-positioning location information of each determined person; a determining module configured to determine the identity of the person to be identified as the determined person corresponding to the smallest first distance, and use the actual location information as accurate-positioning location information of the determined person.

17 Claims, 6 Drawing Sheets

(51) Int. Cl.
  *G06K 9/00* (2006.01)
  *A63B 67/00* (2006.01)
(52) U.S. Cl.
  CPC ....... *A63B 2220/12* (2013.01); *A63B 2230/04* (2013.01); *G06T 2207/30196* (2013.01); *G06T 2207/30221* (2013.01)
(58) Field of Classification Search
  CPC .... A63B 2024/0025; A63B 2024/0028; A63B 2024/0056; A63B 2220/12; A63B 2220/40; A63B 2220/836; A63B 2225/50; A63B 2225/54; A63B 24/00; G05B 15/02; G06F 17/30864; G06F 17/3087; G06F 17/30876; G06F 17/30879; G06F 19/00; G06K 7/10227; G06K 7/10297; G06K 7/10306; G06K 7/10366; G06K 9/00342; G06K 2017/0045; G06N 5/02; G06N 7/005; G06Q 50/20; G06Q 50/22; G06Q 90/00; G08C 17/02; G09B 19/0038; H04L 43/04; H04L 67/12; H04Q 9/00; H04W 4/02
  See application file for complete search history.

ACTIVE PERSON POSITIONING DEVICE AND ACTIVITY DATA ACQUISITION DEVICE

CROSS-REFERENCE TO RELATED APPLICATION

This application claims the priority of China Patent Application No. 201710723516.2, filed in China on Aug. 22, 2017, the entire contents of which are hereby incorporated by reference.

TECHNICAL FIELD

The present disclosure belongs to the field of mobile positioning technology, and in particular, relates to an active person positioning device and an activity data acquiring device.

BACKGROUND

In sports events such as soccer and basketball, and other activities, in order to arrange strategies and tactics for the real situation, coaches need information about the real-time position of each player from the hosts and visitors, and each referee. At present, the positioning accuracy in the prior art is low, which cannot meet requirements and cannot obtain accurate location information of each person. In addition, the ordinary real-time statistical data mainly relying on manual statistics can only output some simple statistics, but cannot be refined to each player's specific running amount, possession time, the number of interception and being intercepted, and player fatigue situation.

For this reason, there is an urgent need for a positioning system that can accurately obtain the accurate location information of each person.

SUMMARY

The present disclosure discloses an active person positioning device and an activity data acquisition device, which can accurately obtain the accurate location information of each active person by combining coarse-positioning, accurate-positioning and identity recognition.

An aspect of the present disclosure is to provide a positioning device used to locate active person, including: a receiving circuit, which is configured to receive coarse-positioning location information of each determined person whose identity is determined, and receive actual location information of an unknown person to be identified on an activity field; a calculating circuit, which is configured to calculate a first distance between a position indicated by the actual location information of the unknown person to be identified and a position indicated by the coarse-positioning location information of each of the determined person; and a determining circuit, which is configured to determine, according to each of the first distance, identity of the unknown person to be identified as the identity of the determined person corresponding to the smallest first distance, and use the actual location information as accurate-positioning location information of the determined person.

Preferably, the calculating circuit is further configured to calculate a second distance between the position indicated by the actual location information of the unknown person to be identified and a position indicated by a accurate-positioning location information of each determined person at the last time and the determining circuit is further configured to determine, according to the first distance and the second distance calculated by the calculating circuit, the identity of the unknown person to be identified as: the determined person corresponding to the smallest second distance among a plurality of the determined persons whose the first distance is less than a first threshold and the second distance is less than a second threshold, or the determined person corresponding to the smallest first distance among a plurality of the determined persons whose the first distance is less than the first threshold and the second distance is less than the second threshold.

Preferably, the receiving circuit is configured to receive the actual location information of the unknown person to be identified on the activity field detected in images of different areas of the activity field; and the determining circuit is further configured to set the actual location information of the unknown person to be identified corresponding to an image acquisition device nearest to the unknown person to be identified among a plurality of image acquisition devices as the accurate-positioning location information, when the identities of the unknown person to be identified determined in the plurality of image acquisition devices that acquire the images of different areas of the activity field are the same person.

Preferably, the positioning device further includes: a team identification circuit, which is configured to identify a team to which the unknown person to be identified belongs according to clothing features of different teams; wherein each determined person in the calculating circuit is: the determined person belonging to the team to which the unknown person to be identified that identified by the team identification circuit belongs.

Preferably, the positioning device further includes: a person actual location processing circuit, which is configured to detect the unknown person to be identified and the location information of the unknown person to be identified in a image according to an image of the activity field, obtain the actual location information of the unknown person to be identified by combing a parameter of the image acquisition device for acquiring the image of the activity field, and send the actual location information to the receiving circuit.

Another aspect of the present disclosure is to provide an activity data acquisition device, including: a positioning device used to an active person for obtaining location information of each active person constantly.

Preferably, the activity data acquisition device further includes: a competition piece positioning device, which is configured to detect a competition piece and the location information of the competition piece in a image according to an image of an activity field, and obtain actual location information of the competition piece by combing with a parameter of an image acquisition device for acquiring the image of the activity field.

Preferably, the activity data acquisition device further includes: an intercept analyzing device, which is configured to determine an intercept person and a fumble person according to the location information of a plurality of the active persons and location information of the competition piece acquired constantly.

Preferably, the activity data acquisition device further includes: a control analyzing device, which is configured to identify a team to which the intercept person judged by the intercept analyzing device belongs and determine the team as a control team, and determine the person closest to the competition piece in the team is an actual control person.

Preferably, the competition piece positioning device is further configured to determine the actual location of the competition piece acquired by the image acquisition device closest to the competition piece among a plurality of the image acquisition devices that obtains the images of the different areas of the activity field as a final actual location of the competition piece, when obtaining the actual location of the competition piece according to the images of the different areas of the activity field.

Preferably, the activity data acquisition device further includes: an image acquisition device, which is configured to acquire an image of an activity field.

Preferably, the activity data acquisition device further includes: a coarse-positioning device, which is carried on the active person to obtain a coarse-positioning location information of the active person and send the coarse-positioning location information to a receiving circuit of the positioning device.

Preferably, the activity data acquisition device further includes: a heart rate detecting device, which is configured to detect heart rate information of the active person.

Preferably, the activity data acquisition device further includes: a statistical device, which is configured to count activity-related information of each active person and information of a competition piece.

Preferably, the activity data acquisition device further includes: a mobile terminal, which is connected with the statistical device and configured to output the activity-related information of each active person and the information of the competition piece counted by the statistical device.

Another aspect of the present disclosure is to provide a positioning device used to locate active person, including: a memory; and a processor, which is coupled to the memory; wherein the memory stores computer-executable instructions, when the computer-executable instructions are executed by the processor, the processor is operated as follows: receiving coarse-positioning location information of each determined person whose identity is determined, and receiving actual location information of an unknown person to be identified on an activity field; calculating a first distance between a position indicated by the actual location information of the unknown person to be identified and a position indicated by the coarse-positioning location information of each determined person; and determining the identity of the person to be identified as the identity of the determined person corresponding to the smallest first distance according to each of the first distance, and using the actual location information as accurate-positioning location information of the determined person.

Preferably, the processor is further operated as follows: calculating a second distance between the position indicated by the actual location information of the unknown person to be identified and a position indicated by a accurate-positioning location information of each determined person at the last time; and determining, according to the first distance and the second distance, the identity of the unknown person to be identified as: the determined person corresponding to the smallest second distance among a plurality of the determined persons whose the first distance is less than a first threshold and the second distance is less than a second threshold, or the determined person corresponding to the smallest first distance among a plurality of the determined persons whose the first distance is less than the first threshold and the second distance is less than the second threshold.

Preferably, the processor is further operated as follows: receiving the actual location information of the unknown person to be identified on the activity field detected in images of different areas of the activity field; and setting the actual location information of the unknown person to be identified corresponding to an image acquisition device nearest to the unknown person to be identified among a plurality of image acquisition devices as the accurate-positioning location information, when the identities of the unknown person to be identified determined in the plurality of image acquisition devices that acquire the images of different areas of the activity field are the same person.

Preferably, the processor is further operated by identifying a team to which the unknown person to be identified belongs according to clothing features of different teams; each determined person in an operation of the processor is the determined person belonging to the team to which the unknown person to be identified belongs.

DETAILED DESCRIPTION OF THE EMBODIMENTS

To enable those skilled in the art to better understand the technical solution of the present disclosure, an active person positioning device and an activity data acquiring device provided in the present disclosure are described in detail below with reference to the accompanying drawings.

In order to facilitate understanding of the present disclosure, the following 'activity' and 'activities' refer to such as basketball, soccer or other custom activities; 'team' refers to the party to which the person belong, for example, hosts team members are belong to one team and visitors team members are belong to another team, and referees for belong to a further another team; 'active person' and 'person' are person involved in the activity who can be in different teams, for example, hosts team, visitors team and referees team; 'activity field' refers to the venue such as soccer, basketball and other activities carried out; 'competition piece' refers to the pieces competed by the hosts team and the visitors team, such as basketball, soccer and other custom objects. 'Module' described in the positioning device of the present disclosure may be a physical module that implements a specific function, such as a circuit, or may be a software program, for example, the processor may execute executable instructions stored in the memory to implement a specific function. The person skilled in the art can make the choice according to the specific design.

Embodiment 1

Figure 1:
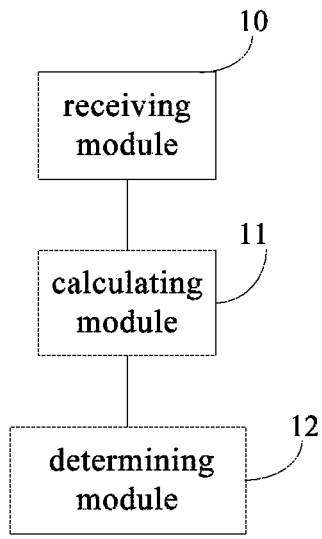
FIG. 1 is a schematic block diagram of an active person positioning device according to a first embodiment of the present disclosure.

FIG. 1 is a schematic block diagram of an active person positioning device according to a first embodiment of the present disclosure. Referring to FIG. 1, the active person positioning device according to a first embodiment includes: a receiving module 10, a calculating module 11, and a determining module 12.

The receiving module 10 is configured to receive coarse-positioning location information of each determined person whose identity is determined, and receive actual location information of an unknown person to be identified whose position is unknown on the activity field.

In particular, firstly, the coarse-positioning location information refers to the location information of the person having poor accuracy on the activity field. The present disclosure does not specifically limit a specific manner of obtaining the coarse-positioning location information, and the coarse-positioning location information may be, but not limited to positioning location information acquired by a positioning device carried by a person. Specifically, the positioning device is preferably but not limited to a positioning wristband. Definitely, the coarse-positioning location information can also be, but not limited to, positioning location information obtained by a positioning device with poor accuracy. The coarse-positioning location information of a determined person k obtained at time t is marked as: longitude coordinate PCOA-X (k, t), latitude coordinate PCOA-Y (k, t).

Secondly, the actual location information refers to an actual location information of the unknown person to be identified on the activity field, which can be latitude and longitude information (longitude coordinate is marked as PC-X and latitude coordinate is marked as PC-Y), and the actual location information has higher positioning accuracy than the coarse-positioning location information. The actual location information can also be the location information manually set in the coordinate system, which is not described in detail herein.

Thirdly, an image of the activity field can be obtained from an image acquisition device (e.g. a camera). According to the image, a pedestrian detection algorithm can be used to detect person (e.g. player, referee, goalkeeper, etc.) in the image, and mark the person as an unknown person to be identified. Here, only the person in the image can be detected, but identity of the person cannot be identified, that is, it is not determined who the person is (it cannot be determined whether the person is person k or person k+1). The identity of each person whose coarse-position information is known is also known. Only the actual location information of the person to be identified is known, but the identity of the person to be identified is not determined, i.e., it is undetermined who the person to be identified is.

Fourthly, there is no specific restriction on how to obtain the actual location information of the unknown person to be identified on the activity field, preferably but not limited to: firstly obtaining the location coordinates of the unknown person to be identified in the image, and then calculating the actual location information of the unknown person to be identified on the activity field according to the location coordinates in the image and the parameters of the image acquisition device. More specifically, the parameters of the image acquisition device include internal parameters and external parameters. The internal parameters and the external parameters can be calibrated by using a mature calibration algorithm. It is preferable to apply with an easy-to-use Zhang Zhengyou calibration algorithm.

The calculating module 11 is configured to calculate a first distance between a position indicated by the actual location information of the unknown person to be identified and a position indicated by the coarse-positioning location information of each determined person.

Specifically, first distance D1 ($k$) between the unknown person to be identified and the determined person k is calculated according to the following formula:

$$D1(k) = \sqrt{(PCOA\_X(k,t) - PC\_X)^2 + (PCO\_Y(k,t) - PC\_Y)^2}$$

Here, the first distance between the unknown person to be identified and each determined person is calculated. If the number of all persons is M, the number of the first distances to be calculated is also M.

The determining module 12 is configured to determine, according to the first distance calculated by the calculating module 11, identity of the unknown person to be identified as the identity of a determined person corresponding to the smallest first distance, and use the actual location information as accurate-positioning location information of the determined person. The accurate-positioning location information of the determined person k at time t is marked as: longitude coordinate PACC-X (k, t), latitude coordinate PACC-Y (k, t).

Specifically, if the first distance D1 ($k$) between the coarse-positioning location of the determined person k and the actual location of the unknown person to be identified is the smallest among all (number is M) first distances, the identity of the unknown person to be identified is regarded as the determined person k, and the actual location information is used as the accurate-positioning location information of the determined person k.

In the present disclosure, the first distance between the position indicated by the coarse-positioning information of each determined person and the actual position of the unknown person to be identified is calculated, and the identity of the determined person whose first distance is minimum is determined as the identity of the unknown person to be identified. The reason for this is that: if the first distance is smaller, the closer the unknown person to be identified is to this determined person. The unknown person to be identified and a determined person are most likely to be the same person if the first distance between them is the smallest. Therefore, compared with the prior art, the present disclosure combines the coarse-positioning, the accurate-positioning, and the identification, and therefore, the accurate location information of each person can be accurately obtained.

Embodiment 2

The active person positioning device provided in the embodiment of the present disclosure also includes: a receiving module 10, a calculating module 11, and a determining module 12. Since those three parts have been described in details in the foregoing Embodiment 1, herein details are not described.

Only differences between this embodiment and the above-described Embodiment 1 will be described below, specifically:

The calculating module 11 is further configured to calculate a second distance between a position indicated by the actual location information of the unknown person to be identified and a position indicated by the accurate-positioning location information of each determined person at the last time.

Specifically, during the activity, the active persons are accurately located by using the active person positioning device provided in the present embodiment to obtain the accurate-positioning location information constantly, that is, the accurate-positioning location information at time: t, t+1, t−1. Specifically, the accurate-positioning location information obtained at time t−1 is taken as the accurate-positioning location information at the last time of time t; and the accurate-positioning location information obtained at time t is taken as the accurate-positioning location information at the last time of time t+1. Therefore, corresponding to a initial time t=0, there is no last time. Therefore, at time t=0, only the active person positioning device provided in the above-mentioned Embodiment 1 is used for positioning.

The accurate-positioning location information of the determined person k at the last time (t−1) of time t is marked as: PACC-X (k, t−1), PACC-Y (k, t−1). At time t, a second distance D2 (k) corresponding to the determined person k is calculated according to the following formula:

$$D2(k) = \sqrt{(PACC\_X(k,t-1)-PC\_X)^2 + (PACC\_Y(k,t-1)-PC\_Y)^2}$$

The determining module 12 is further configured to determine, according to the first distance D1 and the second distance D2 calculated by the calculating module, the identity of the unknown person to be identified as follows: the determined person corresponding to the smallest second distance D2 among a plurality of the determined persons whose the first distance D1 is less than a first threshold TH1 and the second distance D2 is less than a second threshold TH2 (the first manner), or the determined person corresponding to the smallest first distance D1 among a plurality of the person whose the first distance D1 is less than the first threshold TH1 and the second distance D2 is less than the second threshold TH2 (the second manner).

Specifically, regarding the first manner, the identity of the unknown person to be identified is selected from the determined persons whose first distance D1 is less than the first threshold TH1 and the second distance D2 is less than the second threshold TH2, so as to delete those identities whose first distance D1 with respect to the unknown person to be identified is greater than the first threshold TH1 and those identities whose second distance D2 with respect to the unknown person to be identified at the last time is greater than the second threshold TH2. Among the remaining determined persons, the identity of the determined person with the smallest second distance D2 is selected as the identity of the unknown person to be identified for the following reason: the position of a person in a short time will not change too much, that is, the second distance D2 will not be too large. Thus, the determined person with a minimum of the second distance D2 is most likely to be the unknown person to be identified.

Regarding the second manner, based on the principle described in the first manner, it is also possible to delete those identities whose first distance D1 with respect to the unknown person to be identified is greater than the first threshold TH1 and those identities whose second distance D2 with respect to the unknown person to be identified at the last time is greater than the second threshold TH2. Among the remaining determined persons, the identity of the determined person corresponding to the smallest first distance D1 is selected as the identity of the unknown person to be identified (the specific principle is as described in Embodiment 1 above).

In practice, the first threshold TH1 and the second threshold TH2 may be specifically set according to actual situations. For example, in a soccer match, the first threshold TH1 and the second threshold TH2 may both be set to 3 m due to the large space of a soccer field.

Therefore, in addition to the above-described Embodiment 1, the present Embodiment 2 is further provided with the principle that the position does not change over a short period of time on the basis of the above-described Embodiment 1.

The determination process of the second distance based on the accurate-positioning location information of the determined person at the last time and the actual location information of the unknown person to be identified is set as above, so as to further perform identity screening and improve the accuracy of positioning.

It should be noted that in practical applications, if the first distances D1 between the unknown person to be identified and all determined persons are greater than the first threshold TH1 or the second distances D2 between the unknown person to be identified and all determined persons are greater than the second threshold TH2, such unknown person to be identified is abandoned without performing identification.

In this embodiment, preferably, the receiving module 10 is configured to receive the actual location information of the unknown person to be identified on the activity field detected in the images of different areas of the activity field. Specifically, the images of different areas of the activity field can be obtained by a plurality of image acquisition devices (such as cameras) located at different positions of the activity field, so that a plurality of actual location information is obtained.

In this case, the determining module 12 is further configured to set the actual location information of the unknown person to be identified corresponding to the image acquisition device nearest to the unknown person to be identified among the plurality of image acquisition devices as the accurate-positioning location information, when the identities of the unknown person to be identified determined in a plurality of image acquisition devices that acquire the images of different areas of the activity field are the same person.

It can be understood that since the image acquisition device closest to a person has the best capturing angle, and therefore, the unknown person to be identified in the image obtained by such image acquisition device is clearer than others. Thus, the actual location information of the unknown person to be identified is more accurate, which facilitates the accurate positioning of the determined person.

Figure 2:
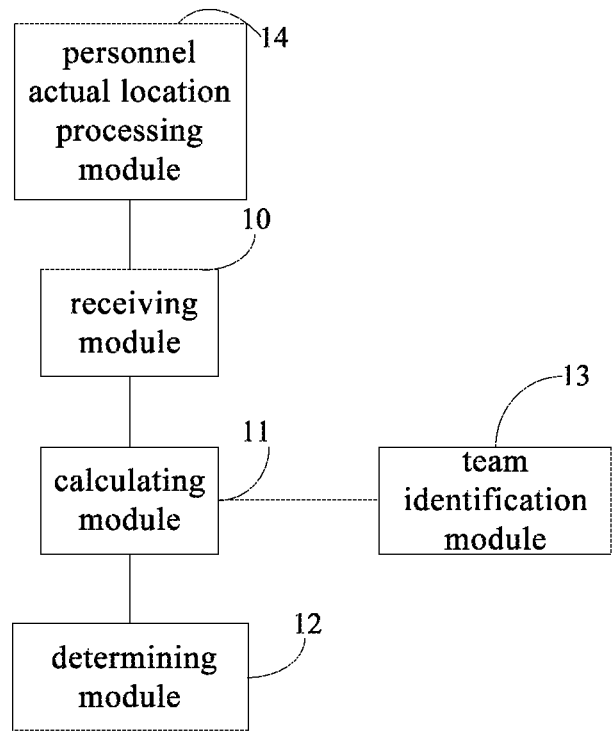
FIG. 2 is a schematic block diagram of an active person positioning device according to a second embodiment of the present disclosure.

Preferably, as shown in FIG. 2, the active person positioning device further includes: a team identification module 13, wherein the team identification module 13 is configured to identify a team to which the unknown person to be identified belongs according to clothing features of different teams. Specifically, clothing features are preferred, but not limited to, colours, patterns and the like. In this case, each determined person in the calculating module 11 is: a determined person belonging to a team to which the unknown person to be identified that identified by the team identification module 13 belongs. Compared to the case that each determined person in the calculating module 11 is all determined persons (including the hosts and visitors, etc.) as discussed in the Embodiment 1, the amount of computation is reduced, which can improve the rate of accurate positioning of the determined person.

The identification algorithm adopted by the team identification module 13 is preferably but not limited to: colour features and Random Decision Forest (RDF).

Further preferably, as shown in FIG. 2, the active person positioning device further includes: a person actual location processing module 14 for detecting the unknown person to be identified and the location information of the unknown person to be identified in the image according to the image of the activity field, obtaining the actual location information of the person to be identified by combing the parameters of the image acquisition device for acquiring the image of the activity field, and sending the actual location information to the receiving module 10, which is specifically described in the description of the Embodiment 1.

It should be noted that although the team identification module 13 and the person actual location processing module 14 are both included in the present embodiment, the present disclosure is not limited thereto, and in practical applications, only one of the two may be included. Definitely, in the foregoing Embodiment 1, one or both of the team identification module 13 and the person actual location processing module 14 may be further included.

Embodiment 3

Figure 3:
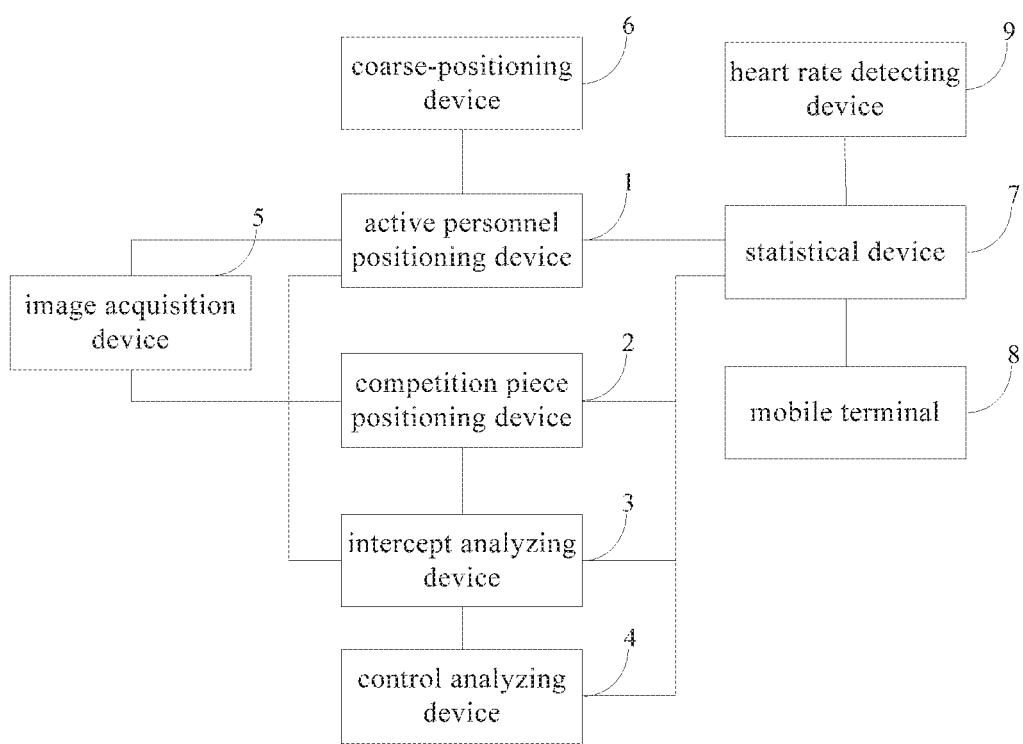
FIG. 3 is a schematic block diagram of an activity data acquisition device according to a third embodiment of the present disclosure.

FIG. 3 is a schematic block diagram of an activity data acquisition device according to an embodiment of the present disclosure. Referring to FIG. 3, the activity data acquisition device provided in the present embodiment includes an active person positioning device 1 for obtaining location information of each active person constantly. The active person positioning device 1 employs the active person positioning device provided in the above Embodiment 1 and Embodiment 2.

Due to applying with the active person positioning device provided in the foregoing Embodiments 1 and 2 of the present disclosure, the activity data acquisition device provided in the embodiment of the present disclosure can accurately obtain the location information of each person to facilitate subsequent data analysis.

As shown in FIG. 3, optionally, the activity data acquisition device further includes a competition piece positioning device 2. The competition piece positioning device 2 is configured to detect a competition piece and the location information (e.g. coordinates) of the competition piece in the image according to the image of the activity field, and then obtain the actual location information of the competition piece by combing with the parameters of the image acquisition device for acquiring the image of the activity field. Specifically, the competition piece positioning device 2 detects based on a competition piece (e.g. soccer, basketball) detection algorithm, for example, RDF (Random Decision Forest) and Adaboost algorithm, and may also be based on the CNN (Convolutional Neural Network) detection algorithm. The parameters of the image acquisition device include the internal parameters and external parameters. The internal parameters and external parameters can be calibrated using a mature calibration algorithm. It is preferable to apply with an easy-to-use Zhang Zhengyou calibration algorithm. The following actual location information of the competition piece is marked as: longitude coordinate FB-X, latitude coordinate FB-Y.

Optionally, as shown in FIG. 3, the activity data acquisition device further includes: an intercept analyzing device 3, which is configured to determine an intercept person and a fumble person based on a preset rule according to the location information of persons and location information of the competition piece acquired constantly. The preset rule may be, but not limited to, the following manner: 1) in a preset time threshold T, constantly determining each person ADJ closest to the competition piece according to the location information of the persons and the location information of the competition piece; 2) if the ADJ are all another team persons, then determining that the competition piece is tackled won by the another team person at time t−T, wherein ADJ (t−T+1) is the intercept person and ADJ (t−T) is the fumble person.

Optionally, the activity data acquisition device further includes: a control analyzing device 4, which is configured to identify a team to which the intercept person judged by the intercept analyzing device 3 belongs and determine the team as a control team, and determine the person in the control team closest to the competition piece are actual control person.

Further preferably, when obtaining the actual location of the competition piece according to the image of the different areas of the activity field, the competition piece positioning device 2 is configured to determine the actual location of the competition piece acquired by the image acquisition device (closest to the competition piece among a plurality of the image acquisition devices that obtains the images of the different areas of the activity field) is the final actual location of the competition piece.

Optionally, the activity data acquisition device further includes: an image acquisition device 5, which is configured to acquire an image of the activity field. The number of image acquisition device may be one or more. When there is a plurality of image acquisition devices, the plurality of image acquisition devices are used to obtain images of different areas of the activity field. In this case, the image acquisition device(s) is/are connected to the actual location processing module 14 of the active person positioning device and the competition piece positioning device 2. Specifically, the image acquisition device 5 may be a webcam, a professional camera, or the like.

Figure 6:
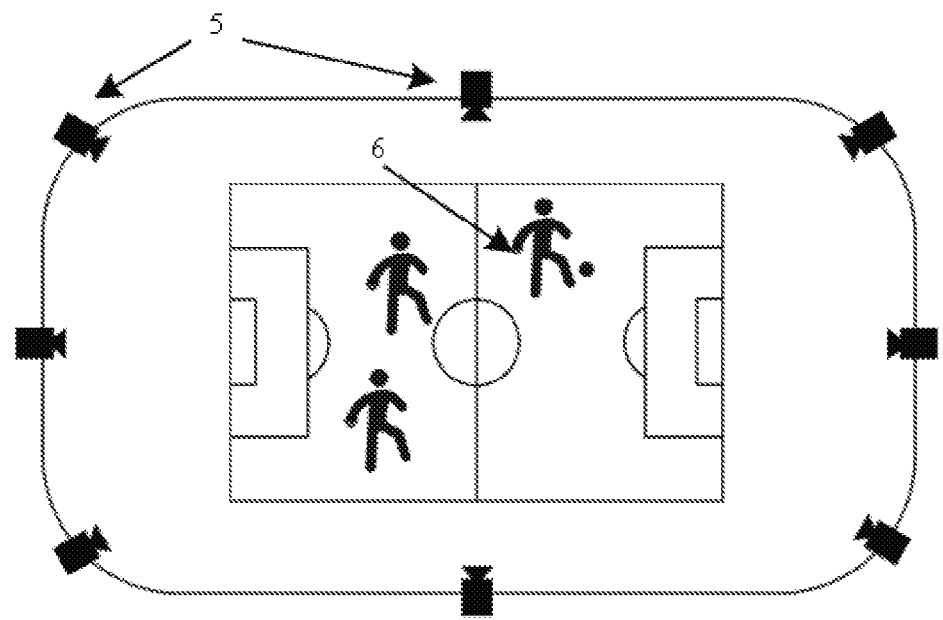
FIG. 6 is a schematic diagram of an activity data acquisition device according to an embodiment of the present disclosure applied at a soccer match.

Referring to FIG. 6, a soccer field of a soccer match is used as an example of the activity field. A plurality of image acquisition devices 5 are uniformly spaced along a circumference of a soccer field. The images can be collected from different angles to obtain images of different areas of the activity field. Thus, the occurrence of image occlusion or dead angle is avoided.

Optionally, the activity data acquisition device further includes: a coarse-positioning device 6, which may be carried on an active person to obtain the coarse-positioning location information of the active person and send the coarse-positioning location information to the receiving module 10 of the active person positioning device 1. Specifically, the coarse-positioning device 6 is preferably but not limited to a wristband with a positioning module embedded therein.

Figure 7:
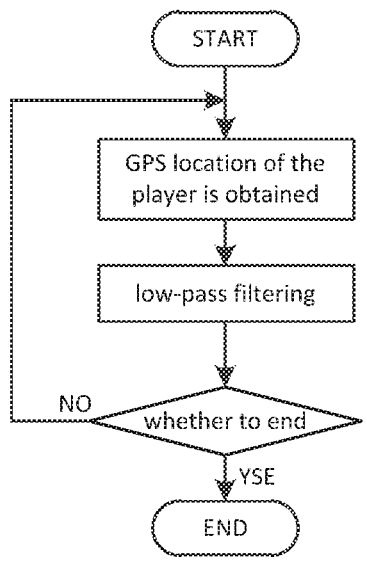
FIG. 7 is a flow chart of a coarse-positioning device to perform coarse-positioning.

FIG. 7 is a flow chart of a coarse-positioning device 6 to perform coarse-positioning. Referring to FIG. 7, the method includes the following steps: firstly, obtaining longitude and latitude coordinates of the active person in the activity field by GPS sensor carried on each active person, and since the value in the height direction can be directly omitted, the coordinate sequence in two directions is obtained. Secondly, low pass filtering the coordinate sequences of longitude and latitude direction to reduce the noise influence result from the sensor.

Preferably, the activity data acquisition device further includes: a heart rate detecting device 9 for detecting heart rate information of the active person, which is able to collect the heart rate information of the active person and access to sufficient active person data.

Figure 8:
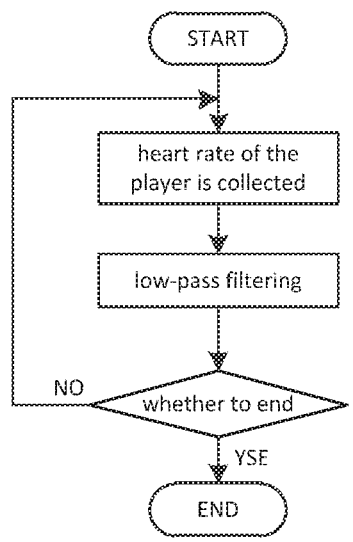
FIG. 8 is a flow chart of a heart rate detecting device for heart rate detection.

FIG. 8 is a flow chart of a heart rate detecting device for heart rate detection. Referring to FIG. 8, the method includes the following steps: detecting the heart rate of each active person by using a heart rate detector carried on each active person to obtain a heart rate data sequence; and then low pass filtering the heart rate data sequence to reduce detection-noise.

In the present embodiment, the coarse-positioning device 6 and the heart rate detecting device 9 are preferably integrated on the wristband, so as to be easily carried by the active person.

Preferably, the activity data acquisition device further includes: a statistical device 7, wherein the statistical device 7 is configured to count activity-related information of each active person and information of the competition piece. The activity-related information includes: accurate-positioning location information, heart rate information of the active person, total ball control time, the number of interception, the number of being intercepted, person speed curve, person running speed, person running time, time of person running speed greater than the threshold, etc.

The person speed curve is preferably but not limited to the following formula:

$$DX = \frac{PACC\_X(k, t) - PACC\_X(k, t - dt)}{dt}$$

$$DY = \frac{PACC\_Y(k, t) - PACC\_Y(k, t - dt)}{dt}$$

$$SP(k, t) = \sqrt{DX^2 + DY^2}$$

Optionally, the activity data acquisition device further includes: a mobile terminal 8, which is connected with the statistical device 7 and configured to output the activity-related information of each active person and the related information of the competition piece counted by the statistical device 7. The mobile terminal may be a screen display terminal, such as a mobile phone or a pad, or may be a sound playback terminal, such as a player.

Figure 4:
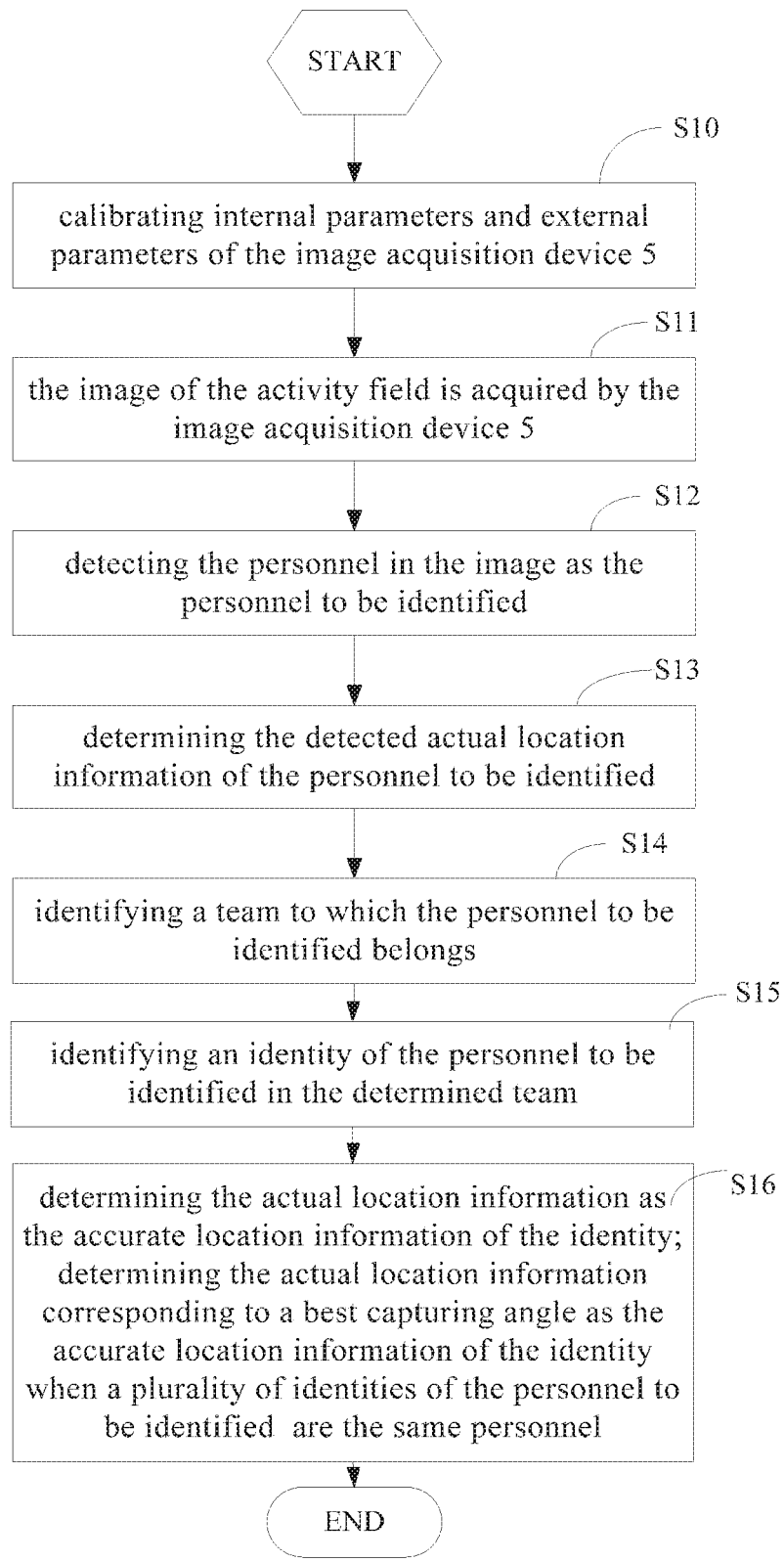
FIG. 4 is a flow chart of positioning an active person by using the activity data acquisition device shown in FIG. 3.

In the present embodiment, the process of locating person by using the above activity data acquisition device may be, but not limited to, the following steps as shown in FIG. 4: S10: calibrating internal parameters and external parameters of the image acquisition device 5. S11: the image of the activity field is acquired by the image acquisition device 5, the frame rate of which is preferably 25 frames/second or 30 frames/second; the active person positioning device 1 continues to execute. S12: detecting the active person in the image as the unknown person to be identified. S13: determining the detected actual location information of the unknown person to be identified. S14: identifying a team to which the unknown person to be identified belongs. S15: identifying an identity of the unknown person to be identified in the determined team. S16: determining the actual location information as the accurate location information of the identity; determining the actual location information corresponding to a best capturing angle as the accurate location information of the identity when a plurality of identities of the unknown person to be identified determined in a plurality of image acquisition devices are the same person.

Figure 5:
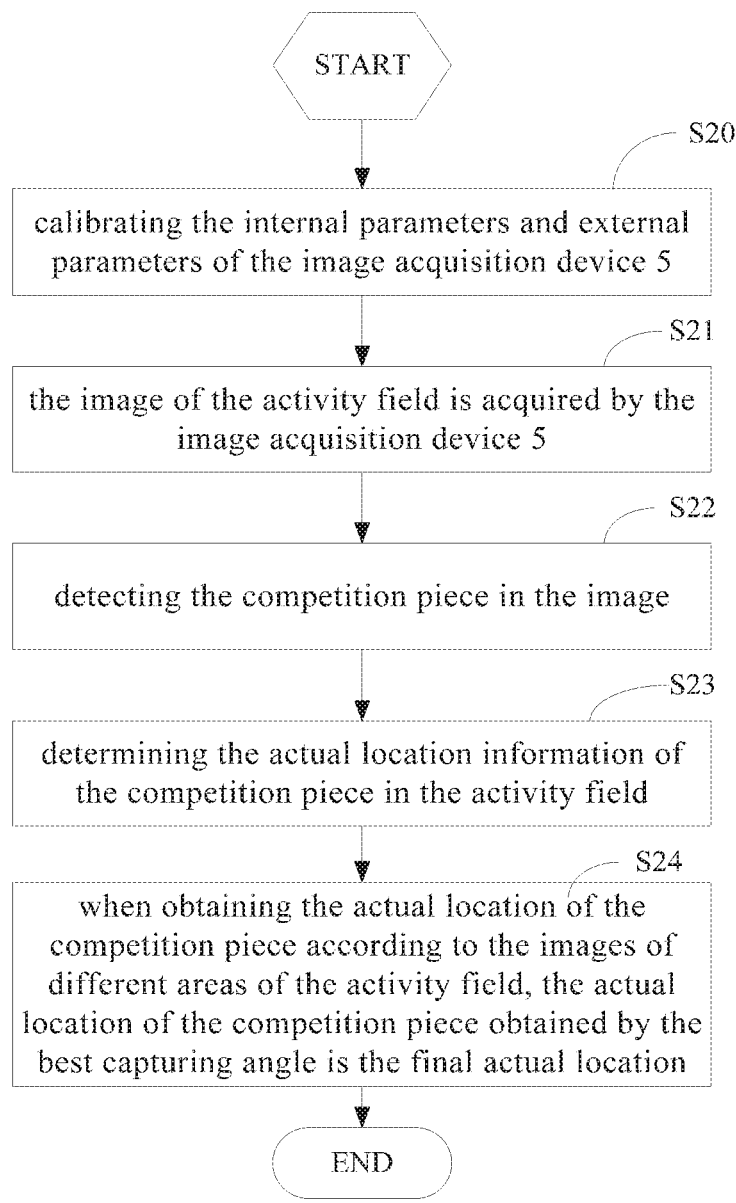
FIG. 5 is a flow chart of positioning the competition piece by using the activity data acquisition device shown in FIG. 3.

The process of locating the competition piece by using the above activity data acquisition device may be, but not limited to, the following steps as shown in FIG. 5: S20: calibrating the internal parameters and external parameters of the image acquisition device 5. S21: the image of the activity field is acquired by the image acquisition device 5, the frame rate of which is preferably 25 frames/second or 30 frames/second; the competition piece positioning device 2 continues to execute. S22: detecting the competition piece in the image. S23: determining the actual location information of the competition piece in the activity field. S24: when obtaining the actual location of the competition piece according to the images of different areas of the activity field, the actual location of the competition piece obtained by the best capturing angle is the final actual location.

Figure 9:
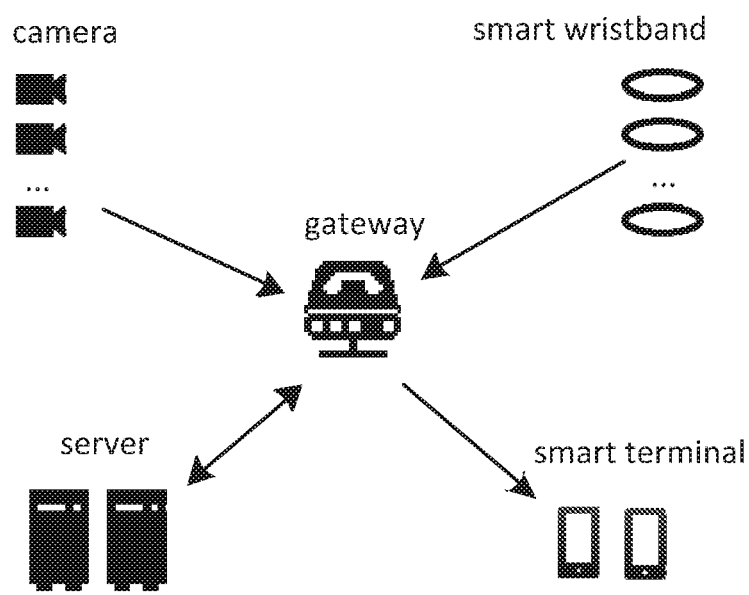
FIG. 9 is a physical architecture diagram of an activity data acquisition device provided in an embodiment of the present disclosure when applied.

FIG. 9 is a physical architecture diagram of an activity data acquisition device provided in an embodiment of the present disclosure when applied. Referring to FIG. 9, a camera (as the image acquisition device 5), a smart wristband (as the coarse-positioning device 6 and a heart rate detecting device 9), a gateway, a server and a smart terminal device (as a mobile terminal) are included. The gateway is used for data transmission. The server is integrated with an active person positioning device 1, a competition piece positioning device 2, an intercept analyzing device 3, a control analyzing device 4 and a statistical device 7. The image data collected by the camera constantly is sent to the server through the gateway. The smart wristband performs detection to the heart rate of the active person and GPS constantly, so as to obtain the active person's heart rate information and coarse-positioning information and sent to the server through the gateway. The server processes and analyzes the collected data to obtain the active person's statistics and forecast data. The smart terminal obtains and displays the statistics and forecast data of the active person from the server through the gateway.

It can be understood that the above embodiments are merely exemplary embodiments used for illustrating the principle of the present disclosure, but the disclosure is not limited thereto. For a skilled person, various modifications and improvements may be made without departing from the spirit and essence of the present disclosure, and these variations and improvements are also considered as the protection scope of the present disclosure.

The invention claimed is:

1. A positioning device used to locate active person amongst a plurality of determined persons, the positioning device comprising:

a receiving circuit, which is configured to receive coarse-positioning location information of each determined person whose identity is determined, and receive actual location information of an unknown person to be identified on an activity field;

a calculating circuit, which is configured to calculate a first distance between a position indicated by the actual location information of the unknown person to be identified and a position indicated by the coarse-positioning location information of each determined person;

a determining circuit, which is configured to determine, according to each of the first distance, identity of the unknown person to be identified as an identity of a determined person corresponding to a smallest first distance, and use the actual location information as accurate-positioning location information of the determined person;

the calculating circuit further configured to calculate a second distance between the position indicated by the actual location information of the unknown person to be identified and a position indicated by previous accurate-positioning location information of each determined person; and the determining circuit further configured to determine, according to the first distance and the second distance calculated by the calculating circuit, the identity of the unknown person to be identified as:

the determined person corresponding to a smallest second distance among a plurality of the determined persons for whom the first distance is less than a first threshold and the second distance is less than a second threshold, or the determined person corresponding to the smallest first distance among a plurality of the determined persons for whom the first distance is less than the first threshold and the second distance is less than the second threshold.

2. The positioning device according to claim 1, wherein the receiving circuit is configured to receive the actual location information of the unknown person to be identified on the activity field detected in images of different areas of the activity field; and the determining circuit is further configured to set the actual location information of the unknown person to be identified corresponding to an image acquisition device nearest to the unknown person to be identified among a plurality of image acquisition devices as the accurate-positioning location information, when the identities of the unknown person to be identified determined in the plurality of image acquisition devices that acquire the images of different areas of the activity field are the same unknown person.

3. The positioning device according to claim 1, further including:

a team identification circuit, which is configured to identify a team to which the unknown person to be identified belongs according to clothing features of different teams;

wherein each determined person in the calculating circuit is: the determined person belonging to the team to which the unknown person to be identified that identified by the team identification circuit belongs.

4. The positioning device according to claim 3, further including:

a person actual location processing circuit, which is configured to detect the unknown person to be identified and the location information of the unknown person to be identified in an image according to an image of the activity field, obtain the actual location information of the unknown person to be identified by combing a parameter of the image acquisition device for acquiring an image of the activity field, and send the actual location information to the receiving circuit.

5. An activity data acquisition device, including: a positioning device used to track an active person for obtaining location information of each active person on a substantially continuous basis;

the positioning device employs the positioning device according to claim 1.

6. The activity data acquisition device according to claim 5, further including:

a competition piece positioning device, which is configured to detect a competition piece and the location information of the competition piece in an image according to an image of an activity field, and obtain actual location information of the competition piece by combing with a parameter of an image acquisition device for acquiring the image of the activity field.

7. The activity data acquisition device according to claim 6, further including:

an intercept analyzing device, which is configured to determine an intercept person and a fumble person according to the location information the active person in a plurality of active persons, and location information of the competition piece acquired on a substantially continuous basis.

8. The activity data acquisition device according to claim 7, further including:

a control analyzing device, which is configured to identify a team to which the intercept person judged by the intercept analyzing device belongs and determine the team as a control team, and determine the active person closest to the competition piece in the team is an actual control person.

9. The activity data acquisition device according to claim 6, wherein the competition piece positioning device is further configured to determine the actual location of the competition piece acquired by the image acquisition device closest to the competition piece among a plurality of the image acquisition devices that obtains the images of different areas of the activity field as a final actual location of the competition piece, when obtaining the actual location of the competition piece according to the images of the different areas of the activity field.

10. The activity data acquisition device according to claim 5, further including:

an image acquisition device, which is configured to acquire an image of an activity field.

11. The activity data acquisition device according to claim 5, further including:

a coarse-positioning device, which is carried on the active person to obtain a coarse-positioning location information of the active person and send the coarse-positioning location information to a receiving circuit of the positioning device.

12. The activity data acquisition device according to claim 11, further including:

a heart rate detecting device, which is configured to detect heart rate information of the active person.

13. The activity data acquisition device according to claim 5, further including:

a statistical device, which is configured to count activity-related information of each active person and information of a competition piece.

14. The activity data acquisition device according to claim 13, further including:

a mobile terminal, which is connected with the statistical device and configured to output the activity-related information of each active person and the information of the competition piece counted by the statistical device.

15. A positioning device used to locate active person amongst a plurality of determined persons, the positioning device comprising:

a memory; and a processor, which is coupled to the memory;

wherein the memory stores computer-executable instructions, when the computer-executable instructions are executed by the processor, the processor is operated as follows:

receiving coarse-positioning location information of each determined person whose identity is determined, and receiving actual location information of an unknown person to be identified on an activity field;

calculating a first distance between a position indicated by the actual location information of the unknown person to be identified and a position indicated by the coarse-positioning location information of each determined person;

calculating a second distance between the position indicated by the actual location information of the unknown person to be identified and a position indicated by an accurate-positioning location information of each determined person at a last time; and determining, according to the first distance and the second distance, the identity of the unknown person to be identified as:

the determined person corresponding to a smallest second distance among a plurality of the determined persons for whom the first distance is less than a first threshold and the second distance is less than a second threshold, or the determined person corresponding to the smallest first distance among a plurality of the determined persons for whom the first distance is less than the first threshold and the second distance is less than the second threshold; and determining the identity of the unknown person to be identified as an identity of a determined person corresponding to a smallest first distance according to each first distance, and using the actual location information as accurate-positioning location information of the determined person.

16. The positioning device according to claim 15, wherein the processor is further operated as follows:

receiving the actual location information of the unknown person to be identified on the activity field detected in images of different areas of the activity field; and setting the actual location information of the unknown person to be identified corresponding to an image acquisition device nearest to the unknown person to be identified among a plurality of image acquisition devices as the accurate-positioning location information, when the identities of the unknown person to be identified determined in the plurality of image acquisition devices that acquire the images of different areas of the activity field are the same unknown person.

17. The positioning device according to claim 15, wherein the processor is further operated by identifying a team to which the unknown person to be identified belongs according to clothing features of different teams; each determined person in an operation of the processor is the determined person belonging to the team to which the unknown person to be identified belongs.

* * * * *